(12) United States Patent
Zhebrak

(10) Patent No.: US 10,286,934 B2
(45) Date of Patent: May 14, 2019

(54) METHOD AND SYSTEM FOR INCREASING EFFICIENCY OF ROLLING STOCK

(71) Applicant: OBSCHESTVO S OGRANICHENNOY OTVETSTVENNOSTYU "SMARTWIZ", Moskovskaya obl. (RU)

(72) Inventor: Leonid Mihailovich Zhebrak, Balashiha (RU)

(73) Assignee: OBSCHESTVO S OGRANICHENNOY OTVETSTVENNOSTYU "SMARTWIZ", Moskovskaya Obl. (RU)

( * ) Notice: Subject to any disclaimer, the term of this patent is extended or adjusted under 35 U.S.C. 154(b) by 253 days.

(21) Appl. No.: 15/282,969

(22) Filed: Sep. 30, 2016

(65) Prior Publication Data

US 2017/0021845 A1    Jan. 26, 2017

Related U.S. Application Data

(63) Continuation of application No. PCT/RU2015/000199, filed on Mar. 30, 2015.

(30) Foreign Application Priority Data

Apr. 4, 2014   (EA) .................................. 201400515
Apr. 4, 2014   (RU) ................................ 2014112992

(51) Int. Cl.
*B61L 3/00*    (2006.01)
*B61C 17/12*   (2006.01)
(Continued)

(52) U.S. Cl.
CPC ............... *B61L 3/008* (2013.01); *B60M 3/06* (2013.01); *B61C 17/12* (2013.01); *B61L 3/006* (2013.01);
(Continued)

(58) Field of Classification Search
None
See application file for complete search history.

(56) References Cited

U.S. PATENT DOCUMENTS 5,549,365 A   8/1996   Vernier et al.
5,950,967 A   9/1999   Montgomery
(Continued)

FOREIGN PATENT DOCUMENTS

CN   101208231 A   6/2008
CN   102774389 A   11/2012
(Continued)

OTHER PUBLICATIONS

International Search Report and Written Opinion for PCT Application No. PCT/RU2015/000199, dated Jul. 16, 2015, along with corresponding partial English translations, 15 pages.
(Continued)

*Primary Examiner* — James M McPherson
(74) *Attorney, Agent, or Firm* — Knobbe, Martens, Olson & Bear, LLP

(57) ABSTRACT

The invention is intended for conserving energy expended by railway rolling stock, for instance by a locomotive when carrying out train operations and shunting, when trains are run in an automatic mode or in a train operator assistance mode. A method for increasing the efficiency of rolling stock includes the following steps: obtaining the parameters of the rolling stock, including at least the following: speed, coordinates, overhead system voltage, traction engine current voltage, brake line discharging; in addition, determining at
(Continued)

least the dependence parameters of an active traction force, braking force, motion resistance force, force of wheel adherence to the rails, and the mass of the rolling stock; then, determining the optimal control to be carried out by traction and braking equipment of railway rolling stock based on the dependence parameters obtained during the previous step; then, transmitting the optimal control, determined during the previous step, to a rolling stock control system for implementation or for displaying to the train operator.

20 Claims, 2 Drawing Sheets

(51) Int. Cl.
  B61L 3/16     (2006.01)
  G01C 22/02    (2006.01)
  G01G 19/04    (2006.01)
  G01S 19/42    (2010.01)
  G01S 19/52    (2010.01)
  B60M 3/06     (2006.01)
  B61L 15/00    (2006.01)
  B61L 25/02    (2006.01)
(52) U.S. Cl.
  CPC .......... B61L 3/16 (2013.01); B61L 15/0072 (2013.01); B61L 25/021 (2013.01); B61L 25/025 (2013.01); B61L 25/026 (2013.01); G01C 22/025 (2013.01); G01G 19/04 (2013.01); G01S 19/42 (2013.01); G01S 19/52 (2013.01); B60L 2200/26 (2013.01); B61L 2205/04 (2013.01); Y02T 30/10 (2013.01)

(56) References Cited

U.S. PATENT DOCUMENTS

| | | |
|---|---|---|
| 2006/0200437 A1 | 9/2006 | Howlett et al. |
| 2006/0282199 A1 | 12/2006 | Daum et al. |
| 2007/0195865 A1 | 8/2007 | Joetten et al. |
| 2012/0318931 A1 | 12/2012 | Cooper et al. |
| 2014/0041980 A1 | 2/2014 | Noffsinger et al. |
| 2014/0277860 A1* | 9/2014 | Pulliam .................. B60L 15/20 701/19 |

FOREIGN PATENT DOCUMENTS

| | | |
|---|---|---|
| CN | 103625510 A | 3/2014 |
| EP | 1136969 A2 | 9/2001 |
| JP | H08-9513 A | 1/1996 |
| JP | 2009-518894 A | 5/2009 |
| JP | 2011-205738 A | 10/2011 |
| RU | 2237589 C1 | 10/2004 |
| RU | 2320498 C1 | 3/2008 |
| RU | 2409484 C2 | 1/2011 |
| RU | 103789 U1 | 4/2011 |
| WO | WO 03/097424 A1 | 11/2003 |

OTHER PUBLICATIONS

International Preliminary Report on Patentability for PCT Application No. PCT/RU2015/000199, dated Oct. 4, 2016, along with its partial English translation, 6 pages.

* cited by examiner

METHOD AND SYSTEM FOR INCREASING EFFICIENCY OF ROLLING STOCK

CROSS-REFERENCE TO RELATED APPLICATIONS

This application is a continuation of International Application No. PCT/RU2015/000199, filed Mar. 30, 2015, titled METHOD AND SYSTEM FOR INCREASING EFFICIENCY OF ROLLING STOCK, which claims the benefit of RU Patent Application No. 2014112992, filed Apr. 4, 2014, and EA Patent Application No. 201400515, filed Apr. 4, 2014, the entirety of each of which is hereby incorporated by reference and made a part of this specification.

FIELD OF INVENTION

The invention is designed to provide conservation of energy used by railway trains, e.g. a locomotive, for train and shunting operations, in automatic or assisted-driver road service.

BACKGROUND

Effective control is an important aspect of railway train operation, which ensures maximum efficiency of pulling power. Presently, railway train handling efficiency relies on driver's experience, thus only experienced drivers aware of the route control railway trains most effectively.

Below, certain terms used in further description of the invention are defined.

Locomotive efficiency is a ratio of effective work performed by carrying wheels of a locomotive to quantity of work used to perform it in autonomous locomotives having an independent power plant (steam or diesel-powered locomotives), or to the energy obtained from overhead system (in electric locomotives or electric trains). Efficiency of a locomotive depends on efficiency of all units participating in transformation of inputted electric energy into mechanical energy and in transferring it to drive wheels, as well as on expenditure of energy for service and auxiliary purposes. Efficiency of a locomotive can be distinguished into efficiency of a locomotive viewed as a power plant and its operational efficiency, which is a function of a locomotive's operating time in various modes of operation, during a train's motion and of fuel (energy) consumption to maintain the locomotive's operable condition during its stops. During stops, fuel consumption of a steam-powered locomotive is considerably higher than that of a diesel-powered locomotive; energy consumption of an electric locomotive is negligible. A diesel-powered locomotive's efficiency depends on design features of the diesel engine, structure of driving gear, cooling device, auxiliary mechanisms, ambient air temperature and pressure, usable power and other aspects; maximum efficiency of a diesel-powered locomotive is around 30%, its operational efficiency is about 25%. The efficiency of an electric locomotive that does not have an independent power plant is 88-90%, efficiency of electric traction, which includes efficiency of electric power plants, external and traction-power supply devices and electric stock is about 22-24%.

Railway track route (track route) is curvature of a railway defined by its radius.

Track grading is the magnitude of its elevation in relation to a certain point.

Brake discharging value is the drop of pressure in brake pipeline of a train during pneumatic braking.

There are various systems and methods to increase operational efficiency, all of them have certain limitations.

Present technological solutions tend to use average specifications of train.

In production, deviation of up to 10% of actual traction characteristics from specifications assumed for a specific type of locomotive is acceptable. Over the service life, which is more than 30 years, deviation of traction characteristics increases. Actual values of resistance to movement differ from their average values even more. In certain cases, deviation may reach 40%. Actual value of wheel-to-rail traction coefficient has the largest deviation from its average value. Due to certain weather effects and some railway conditions, actual traction coefficient may be 2.5 times less than estimated value, thus accordingly reducing maximum possible value of usable traction effort of a locomotive by 2.5 times.

Present technology includes invention RU2409484 "Method and System for Improvement of Train Driving Technique and Decrease in Fuel Consumption", GENERAL ELECTRIC COMPANY (US) published on 20 Jan. 2011. This invention relates to a method and a system to improve train-driving technique. The method involves estimation of a train's weight, determining current location of the locomotive-driven train, detecting sections with alterations of track relief before the moment of the train reaching the section, and adjustment of power output of the locomotive-driven train. The described solution does not use actual (calculated for a specific train) parameters (it uses average values) of traction and braking characteristics, dependencies between resistance to movement and wheel-to-rail traction value, thus control action is less accurate and effective. Calculation of actual values of dependencies of locomotive-driven train and ambient conditions is necessary for calculation of a control action that would minimize energy consumption to ensure effective work.

SUMMARY OF THE INVENTION

The proposed invention is designed to eliminate drawbacks of the existing inventions.

The effect of this invention is minimization of energy consumption for train and shunting operations. This effect is achieved by estimation of actual values of dependencies of traction and braking characteristics, dependencies of resistance to movement and wheel-to-rail traction coefficient used in calculation of energy efficient control input.

In one of the embodiments of the invention, a method of enhancing efficiency of train involves the following steps: train parameters are obtained, which include at least the following: speed, coordinates, overhead contact system voltage, traction engine voltages, brake discharge value. Besides that, at least the following values are estimated: dependency parameters of effective traction effort, braking force, resistance to movement force, wheel-to-rail traction force, weight of train. After that, optimal control input is determined to be realized by traction and braking equipment of railway train, based on dependency values obtained at the previous step. After that, optimal control input determined at the previous step is transmitted to the train's control system to be implemented or displayed to a driver.

In some of the embodiments of the invention, steps of the above methods are performed in a cycle.

In some of the embodiments of the invention, coordinates and speed of the train are determined with the use of radio navigation systems.

In some of the embodiments of the invention, GPS or Glonass is used as the radio navigation system.

In some of the embodiments of the invention, at least total resistance to movement and braking effort necessary to estimate the weight of the train are determined on the basis of data obtained during previous cycle of calculation.

In some of the embodiments of the invention, coordinates and speed of the train are determined with the use of an odometric sensor.

In some of the embodiments of the invention, at least the weight of the train and values of the following dependencies are determined on the basis of the data of at least one previous cycle: acting traction effort, braking effort, resistance to movement value and wheel-to-rail traction effort.

In some of the embodiments of the invention, at least values of dependencies and the weight of the train are determined with the use of values of these dependencies determined by calculation.

In some of the embodiments of the invention, parameters necessary to estimate the weight of the train are determined with the use of a priori statistical information.

In some of the embodiments of the invention, a priori statistical information includes at least statistical expectation and covariance matrix of the estimated parameters and covariance matrix of measuring errors.

In some of the embodiments of the invention, a priori statistical information includes at least statistical expectation and correlation matrix of the estimated parameters and correlation matrix of measuring errors.

In one of the embodiments of the invention, it may be implemented as a system designed to enhance efficiency of a train including: one or more instruction processing devices, one or more data storage device, one or more programs where one or more programs are stored on one or more data storage device and are processed by one or more processor, with one or more programs includes the following instructions: train parameters are obtained, which include at least the following: speed, coordinates, overhead system voltage, traction engine voltages, brake discharging value. Besides that, at least the following values are estimated: dependency parameters of effective traction effort, braking force, resistance to movement force, wheel-to-rail traction force, weight of train. After that, optimal control input carried out by traction and braking equipment of railway train, based on dependency parameters obtained at the previous step. After that, optimal control input determined at the previous step is transmitted to the train's control system to be implemented or displayed for a driver.

The system may be implemented to have the ability to perform instructions repeatedly.

The system may be implemented to have the ability to determine coordinates and speed of the train with the use of radio navigation systems.

In some of the embodiments of the system, GPS or Glonass is used as the radio navigation system.

The system may be implemented to have the ability to determine coordinates and speed of the train with the use of radio navigation systems.

The system may be implemented to have the ability to determine, on the basis of the previous cycle, at least total resistance to movement and braking effort values necessary to estimate the weight of the train.

In some of the embodiments of the invention, at least the weight of the train and parameters of the following dependencies are determined on the basis of the data of at least one previous cycle: acting traction effort, braking effort, resistance to movement value and wheel-to-rail traction effort.

The system may be implemented to have the ability to determine parameters necessary to estimate the weight of the train with the use of a priori statistic information.

In some of the embodiments of the system, a priori statistical information includes at least statistical expectation and covariance matrix of the estimated parameters and covariance matrix of measuring errors.

In some of the embodiments of the system, a priori statistical information includes at least statistical expectation and correlation matrix of the estimated parameters and correlation matrix of measuring errors.

The system may be implemented to have the ability to estimate at least values of dependencies and the weight of the train with the use of values of these dependencies determined during calculation.

In some of the embodiments of the invention, it is implemented as a distributed efficiency-enhancing system including:
  two or more computer systems connected with the use of communications facilities, where each of the systems includes the following:
  i. one or more instruction processing devices;
  ii. one or more data storage devices;
  iii. one or more programs implementing the method for enhancing efficiency of the train stated above, where steps of the method may be performed on different computer systems.

DETAILED DESCRIPTION OF THE INVENTION

Figure 1:
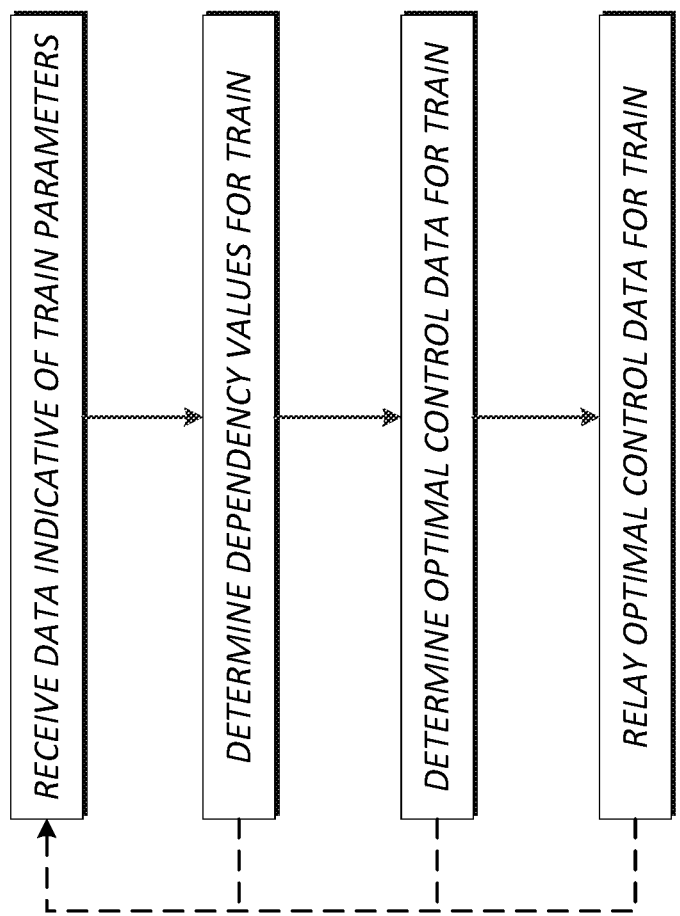
FIG. 1 is a diagram illustrating a method for enhancing performance of a train by minimizing energy expenditure for operating the train.
Figure 2:
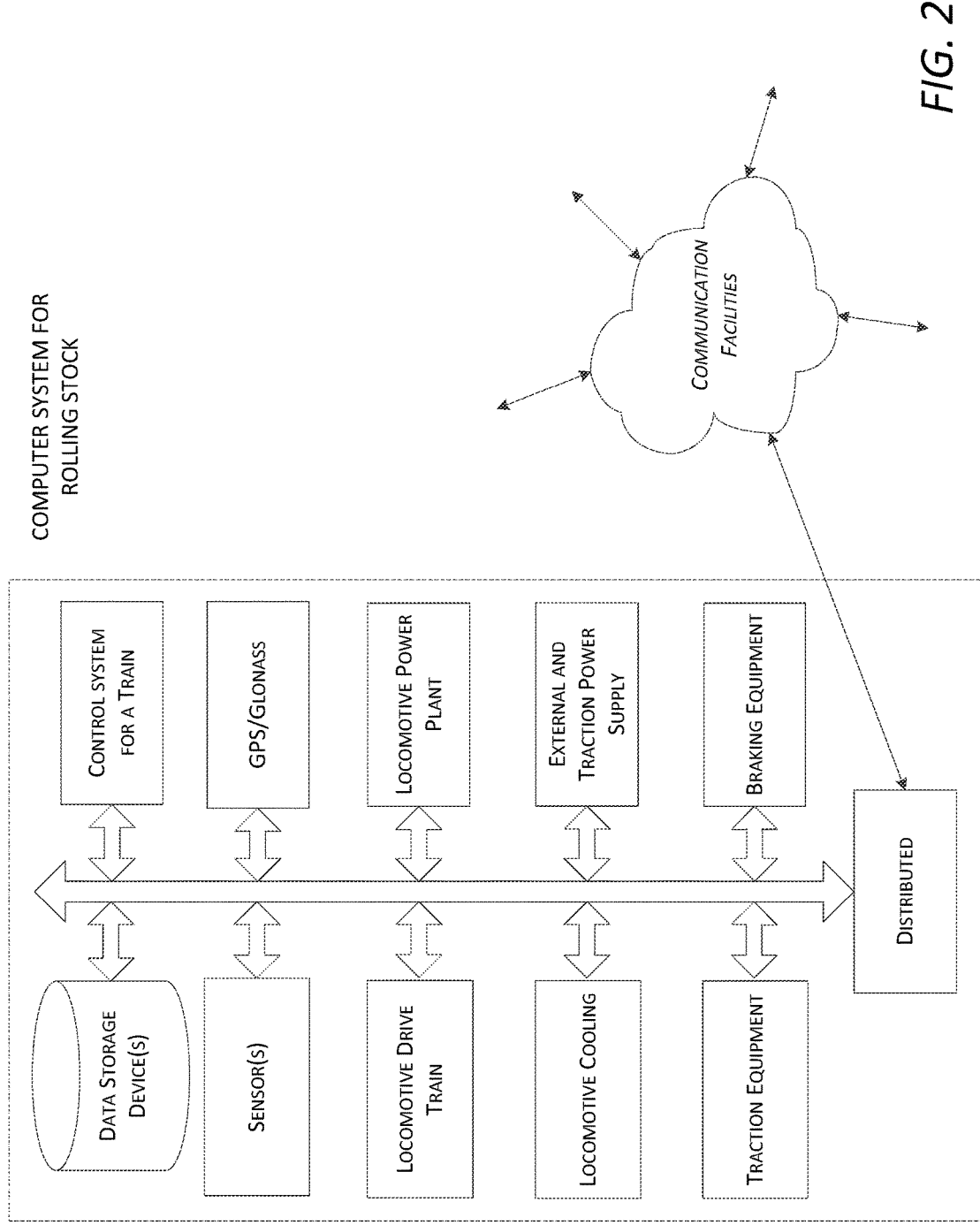
FIG. 2 illustrates a system for enhancing performance of a train by minimizing energy expenditure for operating the train.

This invention proposed in several embodiments may be implemented as a method realized with a computer, as a system or a computer-readable medium containing instructions for implementation of the above method.

In certain embodiments, the invention may be implemented as a distributed computer system.

For the purposes of this invention, a system is a computer system, ECM (electronic computing machine), PNC (programmed numerical control), PLC (programmed logic controller), computerized control systems and any other devices capable to perform a set well defined sequence of operations (actions, instructions).

An instruction-processing device is an electronic unit or an integrated circuit (a microprocessor) performing computer instructions (programs).

The instruction-processing device reads computer instructions (programs) from one or more data storage devices and executes them. Data storage devices may include but are not limited to, hard disc drives (HDDs), flash memory drives, ROM (read-only memory), solid-state drives (SSD) or optical drives.

A program is a succession of instructions designed to be executed by a control device of a computer or by an instruction-processing device.

In the invention, energy-saving effect is achieved by estimation and application of traction force and braking force by a locomotive-driven train for the distance of $s_k - s_0$ during the time T and compliance of safety requirements including, without limitation, speed limits and locomotive warning system's indications, so that energy used by a locomotive for train operation will be minimal:

$$A = \int_{s_0}^{s_k} F ds \to \min \qquad (1)$$

where:

$$M\left(\frac{1+\gamma}{\zeta}\right)\frac{dv}{dt} = F - F_\circ - W(v,x) - B(p,v,t_p),$$

M is the weight of the train, t;
v is the speed, m/s;
F is the traction effort or braking effort of a traction drive equipped with energy recuperation system, kN;
$F_э$ is the braking effort of a traction drive not equipped with energy recuperation system, kN;
W is total resistance to movement, kN;
B is the pneumatic (electro-pneumatic) braking effort, kN;
$\zeta$ is the converting factor, which depends on measurement units used in calculation;
p is brake discharging value, kPa;
x is the current coordinate;
$\gamma$ is the inertia factor;
$t_p$ is the time elapsed from the moment of application of pneumatic brakes.

To calculate energy-optimal traction effort F, current values of the following dependencies need to be known:
total resistance to movement of the railway train;
wheel-to-rail traction force;
traction force of the locomotive-driven train;
braking force of the locomotive-driven train.

Besides, values of maximum and minimum traction effort determined using technical specifications of the locomotive-driven train are required.

The term "dependency value" shall mean such a value p (p is dimension vector n) that for each pair of values x, y of the expression y=f(x,p)
and for every $i=\overline{1,n}$ it follows that $p_i$=const (depends on neither x nor on y).

The method of enhancing efficiency of train according to the invention involves the following steps:
train parameters are obtained, which include at least the following:
  speed, coordinates, traction drive voltage, traction engine currents, brake discharging value;
the train's speed and coordinates may be determined on the basis of, without limitation, sensor indications or by using radio positioning facilities, e.g. GPS of Glonass.

Dependency values of effective traction effort are determined, based on which effective traction effort is determined;

Dependency of actual (effective) traction effort on measured parameters, e.g., for a locomotive with commutator motors may be represented as follows:

$$F_Ф=\omega(v,I,U), \qquad (2)$$

where v is the locomotive-driven train's movement speed;
I is the current flowing through armature circuit of traction engines of the locomotive-driven train;
U is the current at armature winding of traction engines of the locomotive-driven train.

Henceforth in the invention, analytical dependency factors may be calculated using, without limitation, Kalman filtering method. Dependency type and used method of factor calculation are not essential for the invention.

The calculated traction effort of the locomotive is limited by minimum and maximum forces, which may technically be realized by a traction drive to a locomotive-driven train $$F_{min}<F<F_{max} \qquad (3)$$

According to one embodiment, minimum and maximum traction effort are inputted at configuration and adjustment stage.

In some embodiments, minimum and maximum traction effort are inputted by driver through a man-machine interface.

The weight of the train is determined;
The weight of the train is determined by using the expression (1) analytically, it should be noted that in some embodiments to determine the weight of the train values, one or several of the stated parameters (M, F, $F_э$, W, B) may be required.

In some embodiments, parameters necessary to calculate the weight of the train are determined with the use of a priori information including at least statistical expectation, covariance matrix of the estimated parameters and covariance matrix of measuring errors.

In some of the embodiments of the invention, at least total resistance to movement and braking effort necessary to estimate the weight of the train are determined on the basis of data obtained during previous cycle of calculation.

Method of calculation of the weight of the train is not essential for the invention and may vary.

Dependency values of effective braking effort are determined, based on which effective braking effort is determined;

Braking effort B may be represented by the following analytical dependency:

$$B=\varphi(p,v,t_p), \qquad (4)$$

where $\varphi$ is the analytical dependency establishing a relation between brake discharging value and braking force B.
p is brake discharging value, kPa;
v is the speed, m/s;
$t_p$ is the time elapsed from the moment of application of pneumatic braking.

Resistance to movement dependency values are determined, on the basis of which total resistance to movement is determined;

Total resistance to movement is determined by main and additional resistance to movement, which may include at least resistance to movement occurring due to plan and profile of railway i:

$$W=M\cdot(i(x)+a_w+b_w v+c_w v^2), \qquad (5)$$

where $a_w,b_w,c_w$ are dependency factors;
M is the weight of the train, t;
v is the speed, m/s;
i(x) is specific resistance to movement due to plan and profile of railway,
Traction factor dependency values are determined, on the basis of which actual traction factor is determined;
Wheel-to track traction force $F_{adh}$ may be represented by the following analytical dependency:

$$F \le F_{adh}=a_{adh}+b_{adh}v+c_{adh}v^2 \qquad (6)$$

Where $a_{adh},b_{adh},c_{adh}$ are dependency parameters requiring calculation;
v is the locomotive-driven train's movement speed;

Apparently, the train's traction effort F cannot exceed traction force. $F_{adh}$ With the use of the data calculated at the previous steps, current and estimated optimal control input is determined, which includes traction effort or braking effort.

With dependency (2), (4), (5) and (6) values and the train's weight known, traction effort is calculated to ensure minimum energy expenditure.

$$A = \int_{s_0}^{s_k} F ds \to \min$$

The optimal value of a locomotive-driven train's power input value is related to the control system of the locomotive-driven train for execution, or for display to the operator.

It will be readily understood by those skilled in the art that specific embodiments of the method and the system for enhancing efficiency of a train are described here as mere examples and that various modifications are possible, which lie within the spirit and scope of the invention.

The invention claimed is:

1. A method of enhancing performance of a train, the method comprising:
   receiving data indicative of train parameters for a train the train parameters comprising speed of the train, coordinates of the train, traction drive voltage of the train, traction engine currents of the train, and brake discharging value of the train;
   determining dependency parameters for the train at least in part based on the data indicative of the train parameters, the dependency parameters comprising effective traction force of the train, braking force of the train, resistance to movement force of the train, and wheel-to-rail traction force of the train;
   determining mass of the train;
   determining control data for the train based on the dependency parameters, wherein the control data corresponds to minimum energy expenditure to operate the train; and
   causing a train control system to control traction and braking equipment of the train based on the control data to enhance performance of the train by minimizing energy expenditure for operating the train,
   wherein the method is performed by a controller.

2. A method according to claim 1, wherein receiving the train parameters for the train, determining the dependency parameters for the train and determining the control data for the train are cyclically performed.

3. A method according to claim 1, wherein the coordinates of the train and the speed of the train are determined using a navigation system.

4. A method according to claim 3, wherein the navigation system comprises a Global Positioning System (GPS) or Glonass.

5. A method according to claim 1, wherein the coordinates of the train and the speed of the train are determined using an odometric sensor.

6. A method according to claim 2, wherein the mass of the train is determined based on data from a previous cycle, the previous cycle data associated with previously determined resistance to movement force of the train, effective traction force of the train, and braking force of the train.

7. A method according to claim 2, wherein the mass of the train and at least some of the dependency parameters are determined based on data from a previous cycle, the previous cycle data associated with previously receiving the train parameters for the train, determining the dependency parameters for the train, and determining the control data for the train.

8. A method according to claim 1, wherein the mass of the train is determined using probability statistical information.

9. A method according to claim 8, wherein the probability statistical information comprises statistical expectation and covariance matrix of estimated parameters and covariance matrix of measuring errors.

10. A method according to claim 8, wherein the probability statistical information comprises statistical expectation and correlation matrix of estimated parameters and correlation matrix of measuring errors.

11. A system for enhancing performance of a train, the system comprising:
    a data storage device that stores instructions; and
    a controller in communication with the data storage device, the controller configured to execute the instructions that cause the controller to:
    receive data indicative of train parameters for a train the train parameters comprising speed of the train, coordinates of the train, traction drive voltage of the train, traction engine currents of the train, and brake discharging value of the train;
    determine dependency parameters for the train at least in part based on the data indicative of the train parameters, the dependency parameters comprising effective traction force of the train, braking force of the train, resistance to movement force of the train, and wheel-to-rail traction force of the train;
    determine mass of the train;
    determine control data for the train, based on dependency parameters, wherein the control data corresponds to minimum energy expenditure to operate the train; and
    communicate the control data to a train control system configured to control traction and braking equipment of the train based on the control data to enhance performance of the train by minimizing energy expenditure for operating the train.

12. A system according to claim 11, wherein the controller is configured to cyclically determine the dependency parameters for the train and determine the control data for the train.

13. A system according to claim 11, further comprising a navigation system configured to determine the coordinates of the train and the speed of the train.

14. A system according to claim 13, wherein the navigation system comprises Global Positioning System (GPS) or Glonass.

15. A system according to claim 11, further comprising an odometric sensor configured to determine at least one of the speed of the train or the coordinates of the train.

16. A system according to claim 12, wherein the mass of the train is determined based on data from a previous cycle, the previous cycle data associated with previously determined resistance to movement force of the train, effective traction force of the train, and braking force of the train.

17. A system according to claim 12, wherein the mass of the train and at least some of the dependency parameters are determined based on data from a previous cycle, the previous cycle data associated with previously receiving the train parameters for the train, determining the dependency parameters for the train, and determining the control data for the train.

18. A system according to claim 11, wherein the mass of the train is determined using probability statistical information.

19. A system according to claim 18, wherein the probability statistical information comprises statistical expectation and correlation matrix of estimated parameters and correlation matrix of measuring errors.

20. A system according to claim 18, wherein the probability statistical information comprises statistical expectation and covariance matrix of estimated parameters and covariance matrix of measuring errors.

* * * * *